June 17, 1930.  P. ARTIGUE  1,764,490
METHOD OF MAKING MOTION PICTURES
Filed Nov. 12, 1925  2 Sheets-Sheet 1
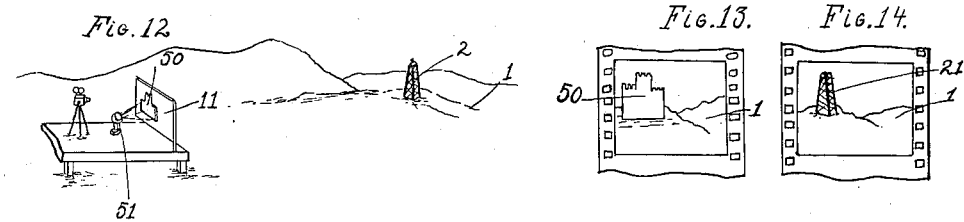
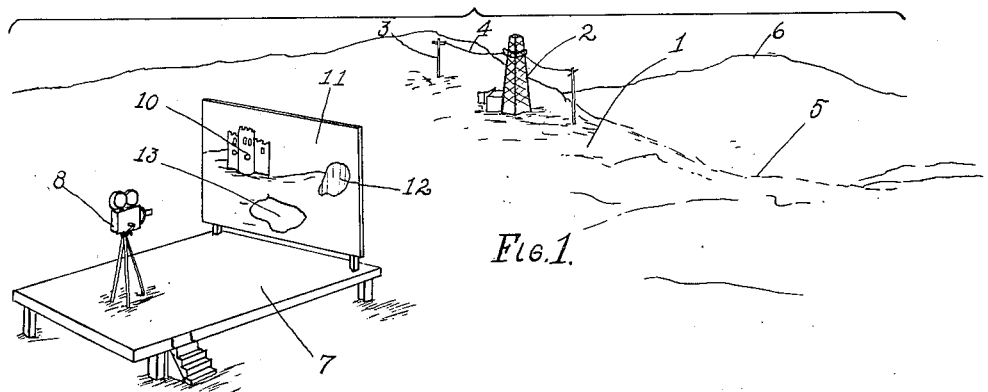
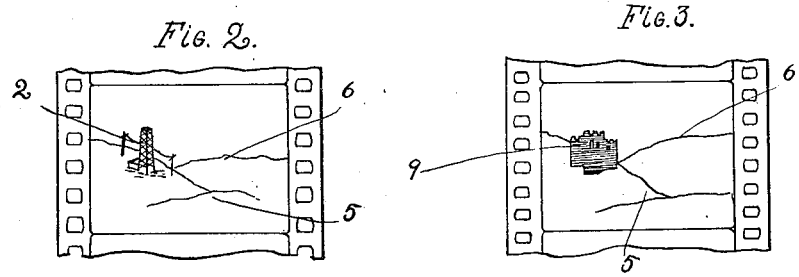
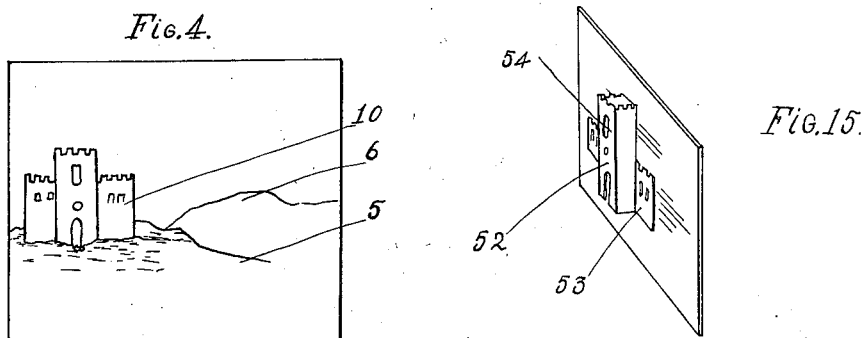
Inventor
Pierre Artigue
by Hazard and Miller
Attorneys June 17, 1930.  P. ARTIGUE  1,764,490
METHOD OF MAKING MOTION PICTURES
Filed Nov. 12, 1925   2 Sheets-Sheet 2

Inventor
Pierre Artigue
by Hazard and Miller
Attorneys.

Patented June 17, 1930

1,764,490

UNITED STATES PATENT OFFICE

PIERRE ARTIGUE, OF LOS ANGELES, CALIFORNIA

METHOD OF MAKING MOTION PICTURES

Application filed November 12, 1925. Serial No. 68,681.

My invention is in the method and in the apparatus used in making moving pictures.

The features of my invention may be applicable to the photography of still pictures and certain features of my invention may be utilized in the so-called colored photography as well as black and white ordinary pictures.

An object of my invention is to eliminate the necessity of making double exposures and also in effect to form a retouching of a picture on a transparent screen through which the picture is taken to avoid retouching all the negatives, as it is obvious in motion pictures on account of the numerous negatives, retouching is a tedious operation as well as being inaccurate.

Another feature of my invention is in the utilization of transparent screens or photographs formed thereon to give a scenic effect of either the foreground or background by photographing through the transparent screen.

Another feature of my invention is the utilization of transparent screens with pictures formed thereon to be utilized in making panoramic moving pictures to facilitate the operation known as panning the picture.

A further object of my invention is to utilize a transparent screen with a picture formed thereon to obtain new background effects by utilizing a still picture camera photographing through the picture on the screen.

Another object of my invention is to utilize color filter dye stains painted or coated on certain portions of the transparent screen to block out or diminish the photographic effect of undesirable or not wanted features of the picture by coating with photographically negative light filter stains.

Another object of my invention is in the taking of so-called dissolving pictures, in which the first photograph may show one scene which is gradually transformed to another. This I do by a special coating on a transparent screen, the coating preferably having a painting thereon and being formed of material which will melt and run off the screen allowing an object to be photographed through the screen. This I do preferably by utilizing a coating of wax which may be in color and applied as a drawing or painting, illustrating some object or part of the scenery or setting. At the proper stage of taking the picture, heat is applied to the coating preferably such as by using a heat reflector causing the wax to melt and run off the screen.

Another feature of my invention is providing on a transparent screen a coating or painting or the like and having the coating project outwardly from the plane of the screen in the form of a bas-relief. This allows control of the shadows without the necessity of building up an actual structure. The bas-relief may be formed of wax, plaster, stucco or the like.

Another object of my invention is to enhance certain parts of the picture by coating or staining certain parts of the transparent screen with photographically positive light filter dyes. I may also combine the light positive and light negative dyes, securing effects in out-of-door scenes similar to those which may be obtained in a studio by using colored lights to give various color values desired.

In carrying out the first part of my invention to avoid double exposure I photograph a natural scene preferably on a moving picture film, mat out by opaque paint or the like undesirable features, form an enlarged picture preferably on glass from the film with the undesirable section matted out and on this section paint in a desirable view. It is immaterial how the enlarged picture on a glass screen is made, as suitable known ways may be used. This view may then be on a transparent screen, being set up in front of a camera taking a picture of the natural background with the objectionable features eliminated by the matting out process and the painted in picture.

In this type of picture I may utilize the major portion of the natural scene painted on the transparent screen, or only the portion painted on the matted out details. The animated picture is taken by the camera through the transparent screen.

In the features of taking panoramic pictures I utilize a transparent screen with a picture formed thereon and take a picture by the camera through the screen with either the animated object moving or the camera moving, or both, thus giving the effect of the object moving in relation to the scene on the transparent screen.

My invention as to its various details will be more readily understood from the following description in which:

Fig. 1 is a perspective diagrammatic view of a landscape with an objectionable element therein, a transparent screen set up in front of the camera to take the picture of the scene with the objectionable feature eliminated.

Fig 2 is a section of a film illustrating the natural scene of Fig. 1.

Fig. 3 is a section of a film similar to Fig. 2 with the objectionable element matted out.

Fig. 4 is a view of the transparent screen with a harmonious type of object painted or sketched on the screen to take the place of the objectionable feature matted out.

Fig. 12 is a diagrammatic illustration of the formation of a dissolving picture using a meltable coating on the screen.

Fig. 13 is a section of a film, showing the scene with the coating.

Fig. 14 is a view of the scene with the coating dissolved by melting.

Fig. 15 is a perspective of a transparent screen showing a picture formed on the screen in bas-relief.

Figure 5:
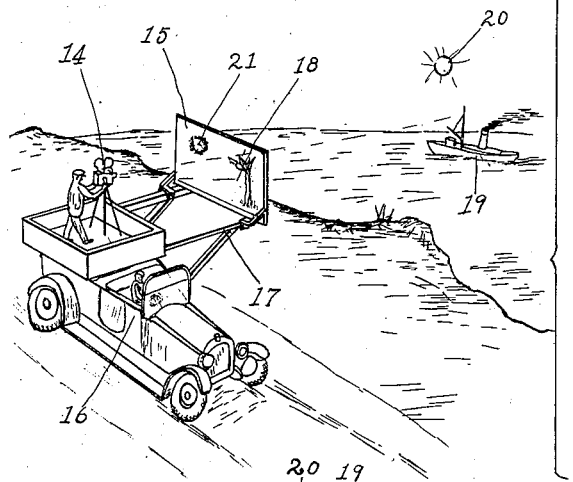
Fig. 5 is a perspective view of a panoramic type of picture taking, showing an adjustable transparent screen with a picture thereon, utilizing a movable mounting for the camera and the screen.

Referring particularly to Figs. 1, 2, 3 and 4 which show the procedure to avoid double exposure and to avoid retouching of negatives, a natural scene in which it is desired to take an animated picture is illustrated by the landscape designated generally by the numeral 1. This contains an objectionable object such as the oil derrick 2 and telegraph pole 3 and wires 4. The valley 5 and hill 6 are desirable features of the picture and in which the scenes are intended to be acted. A platform 7 of suitable character is constructed to mount the camera 8 in a relatively fixed position in relation to the scene. This camera is utilized to take a picture, one of the sections of the film being indicated in Fig. 2. This type of picture may if desired be taken by a still picture camera. A scene is taken photographing the scenery including the objectionable derrick and this photograph is printed, then the objectionable matter is matted out as indicated at 9 in Fig. 3. A suitable enlarged photograph may then be made on the glass screen 11, of if desired an artist may make a painting following the outlines of the natural scenery on the screen. Where the matted out portion occurs he may then paint in a castle as indicated by 10 in Fig. 1.

The transparent screen is positioned so that when the camera 8 is adjusted the castle 10 will block out the objectionable oil derrick, and the other features of the painting and of the natural scene will harmonize and work one into the other. When this has been accomplished the moving picture photograph may be taken through the screen of an animated scene, this animated act not being shown. This procedure utilizes the natural scenery and background with the artificial building or castle taking the place of the oil derrick.

Fig. 2 shows the picture taken in the first instance, showing the derrick and before this has been matted out by the mat 9 in Fig. 3. It is to be understood that the enlargement may be made in any suitable manner known in the art, a simple way being by the use of brush development for enlarging, the enlargement being made as above mentioned on a glass screen.

In this type of picture I may utilize a color filter 12 formed of a semi-transparent dye stain to change the photographic effect of objects focused through the filter and I utilize a red dye to give a photographically negative effect and thereby reduce the photographic imprint of an object or action on the film or absolutely eliminate the same.

I may also use a photographically positive light filter stain 13, such as a yellow or blue to photographically enhance the color value of objects photographed therethrough. These stains may readily be placed in proper position on the transparent screen by coating the portions of the screen through which the light from the particular objects passes to the lens of the camera. The stains should be graduated to eliminate harsh outlines where the stains join the transparent screen.

The filter stains may be readily located in the proper place on the transparent glass screen by the camera man looking through his camera finder and having an assistant paint the filter on the screen under his direction; or else the camera man himself may note the particular portion of the screen through which the light from the objects which are desired to be photographically changed, passes, and then paint or stain the filter medium on the screen.

Figure 6:
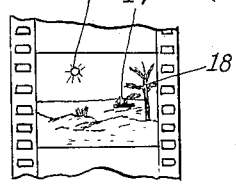
Fig. 6 is a section of a film, indicating the type of picture taken in Fig. 5.

In regard to the panoramic features of my invention, referring particularly to Figs. 5 and 6, the camera 14 and screen 15 are shown mounted on a motor car 16 with the screen adjustable longitudinally on a bracket 17. This screen has a suitable picture 18 thereon to harmonize with the animated action such as the vessel 19. The sun is indicated by the numeral 20, being near the horizon and a light filter stain 21 is placed on the screen to diminish the photographic effect of the sun but to allow the rest of the picture to have its full color value.

In taking a panoramic picture with the arrangement of Fig. 5, if the vessel is stationary the camera and screen may be moved by means of the motor car and the camera slowly moved across the screen to indicate relative movement of the vessel 19 in reference to the foreground 18; or if the vessel is moving the motor car may be kept stationary and the camera slowly moved across the screen, keeping the vessel in focus. This manner of photography produces a picture as shown in Fig. 6, in which the vessel is shown moving relative to a desirable foreground setting, the direct sun rays having been diminished by the light filter 21, but the remaining parts of the picture have their full color value.

Figure 7:
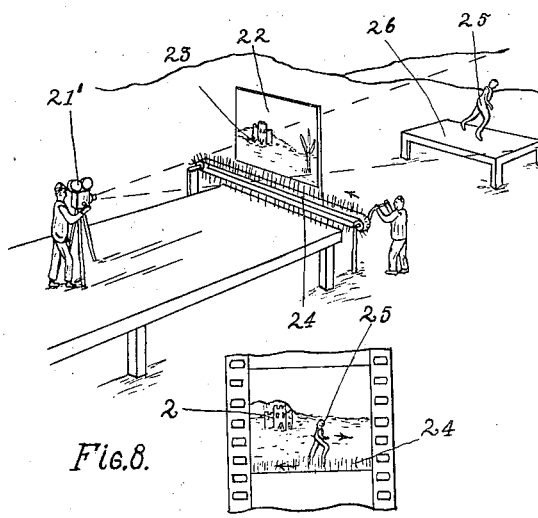
Fig. 7 is another type of panoramic picture having a transparent screen and camera with a painting on the screen, utilizing a relatively stationary actor and moving foreground to give a panoramic effect.
Figure 8:
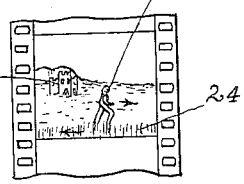
Fig. 8 is a detail of a film showing the picture obtained in Fig. 7.

Referring particularly to Figs. 7 and 8, the camera 21' is shown mounted on a platform with a stationary screen 22 in fixed relation to the camera. The scene such as a castle 23, is in this instance shown similar to the castle formed in connection with the pictures in Figs. 1 to 4, and is intended to indicate another manner of using the screen 11 of Fig. 1. In this case a foreground animated action is carried on by the moving foreground 24 shown by an endless belt having either canvas with a picture of a natural foreground thereon or with grass or the like which may be moved to shift in the foreground of the picture. The middle distance action is shown by a runner 25 running on a tread mill 26.

In this type of picture the camera may be focused with a slow traveling motion across the picture showing the actor running in one direction in regard to the castle and to the landscape of Fig. 1, this motion being relatively slow and the foreground being moved rapidly in the direction opposite to the runner.

Figure 9:
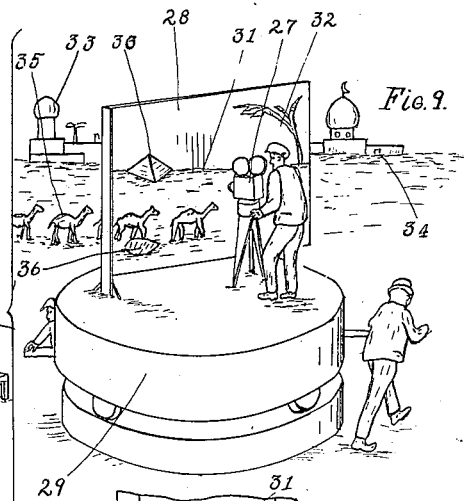
Fig. 9 is a detail of a further type of panoramic picture in which the transparent screen and camera are relatively stationary and both being mounted on a turntable.
Figure 10:
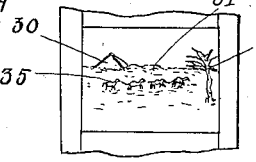
Fig. 10 is a detail of the film taken in Fig. 9.

The arrangement for panoramic pictures of Figs. 9 and 10 is intended to depict a scene taken in a studio lot to eliminate undesirable background features. In this case the camera 27 and screen 28 are mounted on a turntable 29. The scene depicts a pyramid 30, a sky line or foreground line 31 with trees 32 being painted on the upper part of the screen, leaving the lower part transparent. A setting 33 which may be a distant part of the lot and possibly utilized in other portions of the total picture is eliminated by having the sky line or foreground line 31 always below the base line 34 of the settings 33.

In a picture of this character a caravan designated by the numeral 35 may be shown by having suitable animals walk across the studio lot and by slowly moving the turntable 29 while the picture is being taken. The camera also may be slowly rotated to shift the scene slowly. This type of picture gives the panoramic effect of a caravan or the like moving slowly past a distant background and more rapidly past the foreground. In taking a scene such as above mentioned I may utilize light filter stains 36 of light positive or negative transparencies to alter the color value of certain details of the picture.

Figure 11:
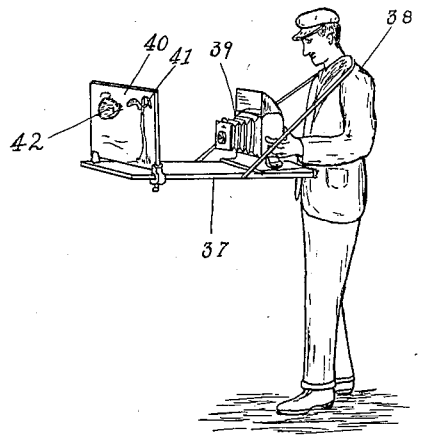
Fig. 11 is a perspective detail of a still picture camera with a transparent screen, with a picture thereon to be utilized to obtain still pictures with additional details to that of the natural scene.

Figure 11 is designed to show an application of my invention in the taking of still pictures in which a frame 37 is indicated as supported over the shoulders of the camera man 38. The camera is placed on this frame as is also an adjustable screen transparent 40. This latter has a foreground 41 painted thereon and may have a light filter dye stain 42 coated in a suitable place to alter the color value of objects photographed therethrough.

For purposes of illustration the camera is indicated as of the reflex type, but a camera focusing on a ground glass which may be inspected at the rear of the camera should be mounted on a tripod.

In utilizing my arrangement of Fig. 11, a screen should be adjusted to and from the lens to secure the proper perspective effect. After the lens has been properly focused on the distant scene, color filters may be stained on the screen to change the color value of objects or actions as desired, such position being readily ascertained by an inspection of the ground glass or merely looking into the reflex hood of the type of camera illustrated. A still picture may then be obtained which will show the scene painted on the screen and the background of the objects desired.

My invention in its various features may be considerably modified for special work. My invention is shown as being applicable to exterior pictures but may also be utilized for interior or detailed views and applies to so-called color photography as well as to black and white pictures. Various features of my invention may also be used for still photography if desired.

It will thus be seen that by the combination of the above details of my invention I may avoid double exposure and retouching of negatives, by doing the retouching on a transparent screen or painting a harmonious picture on the screen and photographing therethrough. Also I may take different types of panoramic pictures, utilizing a transparent screen with a picture on the screen and I may also change the color value of various details of the pictures without affecting the picture as a whole by the use of light filter dye stains.

In the making of dissolving pictures by an alternative procedure as shown in Figs. 12, 13 and 14, a setting such as that of Fig. 1 is shown, in which the oil derrick 2 is on a part of the actual landscape 1 and the picture of a castle similar to that of 10 designated by the numeral 50 is painted on the transparent screen 11 by utilizing wax paints or else a coating of wax with paints on the coating, thus making an opaque section of the screen.

It will be noted by Fig. 13 that the mat 50 is painted directly on the frame of the film and that when the picture is enlarged the artificial painting or drawing 10 is made on the transparent screen 11 at the part blocked out by the mat 50.

A heater 51, shown preferably as an electric reflecting radiator is positioned so that sufficient heat may be applied to the coating or picture 50 to melt the wax and cause it to run off the screen. This gives a gradual transformation from the picture shown in Fig. 13, in which a castle appears as if on the background, and as the wax becomes transparent due to heat the oil derrick in the distance begins to show through the wax and on further heating the wax all runs clear of the screen, leaving a transparency substantially as good as that of the remaining part of the screen.

A setting such as this might be used for instance if it is desired to take a historical picture, showing a castle on the background and dissolve the scene gradually into a modern one showing an oil derrick, both scenes having suitable animated action.

In Fig. 15 the opaque coating or picture on the screen is illustrated as a bas-relief. The illustration is of a castle much the same as shown in Figs. 1, 4 and 12, but instead of the whole of the picture being formed flat on the screen, certain parts may be extended therefrom. For instance, the wings 53 of the castle may be in flat paint and the tower 54 extend out from the screen as a bas-relief. The bas-relief may be placed on the screen by utilizing wax, plaster of Paris, stucco, molding clay or other suitable material and painted in appropriate colors.

This construction of an opaque picture or the like on a screen in having parts in bas-relief allows shadows to be formed and controlled by projecting lights at suitable angles on the picture. These shadows may be made to harmonize with the shadows in the setting behind the transparent screen.

For the purpose of illustrating my complete method of making motion pictures I have set forth the invention by describing the various steps or sub-methods employed; it is however, understood that all the various sub-methods or such parts of them as are required to give the desired result may be utilized in taking one series of pictures. Thus the steps of blocking out and forming a painting on a screen to avoid double exposure and retouching may be utilized with the features of the wax coating which may be dissolved by heat and also that certain portion of the scene painted on the screen may be in bas-relief for the purpose described above. Moreover, the screens so formed may be utilized in taking panoramic pictures or in relatively stationary sets.

It is also to be understood that the utilization of the light filters coated on the screens may apply to any of the sub-methods or to the complete method of making motion pictures and also to the various screens.

In applying the light filter stains 12 and 13 of Fig. 1, 21 of Fig. 5, 36 of Fig. 9, or 42 of Fig. 11, care must be exercised that these are not too deep in color as a very thin film of a filter stain on a transparent screen materially affects the photographic value of objects or scenes photographed therethrough. In addition, these filter stains should be gradually thinned out at the edge so that there is no distinct delineation of the ending of the stain and the beginning of the clear screen. This may be effected by having a gradual change from the transparency of the glass to the full color value of the filter. This change should be so gradual that the stain does not photograph on the transparent screen as a distinct color unit. In addition the lighting should be so directed on the screen that the parts having the filter stain do not reflect light back to the camera, and if they do not reflect light they will not photograph as color units.

When photographing through the glass, the photographer may if desired use the old expedient of having a hood, cover or the like over the glass screen so as to prevent any front illumination from being reflected back to the camera. Thus he may utilize the so-called black box plan of photography when making these so-called glass shots. Hence when front light is eliminated from the front of the screen the color filters cannot reflect any light back to the camera and therefore will not show as blotches.

Having described my invention, what I claim is:

1. In the method of making motion pictures, comprising positioning a transparent screen with an artificial foreground picture thereon in front of a camera, taking a picture of a distant moving object through the screen and shifting the camera relative to the screen to conform to the lateral movements of the object to give the effect of a distant object moving behind and past a foreground.

2. In the method of making moving pictures, comprising positioning a transparent screen with an artificial picture thereon in front of a camera, moving the screen and camera relative to a distant object, photographing through the screen to give the effect of a distant object moving relative to the artificial picture.

3. In the method of making moving pictures, positioning a transparent screen with an artificial foreground picture thereon in front of a camera, holding said screen stationary while a distant object moves relative thereto and maintaining said object focused in the camera by following the movement of the object with the camera to give the effect of a distant object moving behind and in relation to the artificial picture.

4. In the method of making moving pictures, mounting a transparent screen relative to a stationary camera on a staging, said screen having an artificial picture thereon with the lower part of the screen transparent, enacting an animated act behind the screen and photographing said scene through the transparent portion of the screen while shifting the position of the staging with the camera and screen.

5. In the method of making moving pictures as claimed in claim 4, in which the lower portion of the artificial picture is adjusted and maintained relative to distant natural features to block out said features during the movement of the staging.

6. In the method of making moving pictures as claimed in claim 4, in which the staging is shiftable and is given a rotary movement.

7. In the method of making motion pictures comprising positioning a transparent screen with an artificial foreground pictured thereon and with an artificial background also pictured thereon, in front of the camera, taking a picture of a distant object through the screen, and shifting the camera and screen one relative to the other to depict lateral movement of the objects to give the effect of a distant object moving behind and passing a foreground, and in front of a background.

8. In the method of making pictures, mounting a transparent screen distinct from the camera, in front of such camera, the screen having a painting thereon representing part of the scenery or set, and staining a transparent portion of the screen with a light filtering medium to affect the photographic color value of the scenes or objects photographed through such filter by the camera.

In testimony whereof I have signed my name to this specification.

PIERRE ARTIGUE.